United States Patent

Hern

[11] Patent Number: 5,141,482
[45] Date of Patent: Aug. 25, 1992

[54] SEAT EXERCISER DEVICE

[76] Inventor: James L. Hern, P.O. Box 51322, Jacksonville Beach, Fla. 32240-1322

[21] Appl. No.: 542,635

[22] Filed: Jun. 22, 1990

Related U.S. Application Data

[63] Continuation of Ser. No. 321,054, Mar. 9, 1989, abandoned.

[51] Int. Cl.⁵ .............................................. A63B 21/04
[52] U.S. Cl. ................................ 482/130; 482/123; 482/129; 482/139; 482/140
[58] Field of Search .................. 272/70-70.4, 272/70 A, 143, 139; 297/465, 484, 485; 2/102, 21, 310, 311, 341, 342; 128/125, 134-139, 142, 143; 182/3, 9; 24/69 R, 170; 482/69, 51, 129, 130, 124, 139

[56] References Cited

U.S. PATENT DOCUMENTS

| | | | |
|---|---|---|---|
| 2,553,007 | 5/1951 | Rosenthal | 128/875 |
| 2,741,412 | 4/1956 | Hinkle | 297/485 X |
| 2,871,927 | 2/1959 | Materi | 182/3 X |
| 3,105,974 | 10/1963 | De Grazia | 2/310 |
| 3,174,798 | 3/1965 | Sprague | 297/485 |
| 4,013,287 | 3/1977 | Dickman | 272/143 X |
| 4,372,553 | 2/1983 | Hatfield | 272/134 X |
| 4,478,414 | 10/1984 | Molloy | 272/142 X |
| 4,506,883 | 3/1985 | Rathbun | 272/143 X |
| 4,564,983 | 1/1986 | Saito | 24/170 |

FOREIGN PATENT DOCUMENTS 515818 12/1939 United Kingdom ................ 297/484

Primary Examiner—Richard J. Apley
Assistant Examiner—D. F. Crosby
Attorney, Agent, or Firm—Arthur G. Yeager

[57] ABSTRACT

An exercise device to be used by a person sitting in a seat includes an adjustable length strap with a friction buckle for firm attachment to a seat of variable sizes. A chest strap with an adjustable length fits around the chest of an exerciser and is connected to the seat strap via a pair of self-retracting elastic cords. A pair of adjustable length shoulder straps clamp on the chest strap to inhibit its downward movement when the exerciser moves forwardly against the tension of the elastic cords and/or tightens the stomach muscles when performing an exercise.

18 Claims, 2 Drawing Sheets

SEAT EXERCISER DEVICE

This is a continuation of copending application Ser. No. 07/321,054 filed on Mar. 9, 1989, now abandoned.

BACKGROUND OF THE INVENTION

1. Field of the Invention

The present invention relates to exercise apparatus and, in particular, to exercise devices that are adaptable for attachment to either a chair or sofa for use at home and work or to a seat while driving or riding in a motor vehicle for use therein.

2. Prior Art

The present invention utilizes an adjustable length strap that is adapted for attachment to a seat or chair. A harness consisting of a second strap that is adjusted to fit around the chest of a user and is connected to the chair strap via a pair of elastic cords. Exercise is accomplished by moving forward and/or to one or the other side at the waist against the elastic cord strength. Sideways and rotary exercise movements are also possible.

A leg exerciser for use in automobiles is disclosed in U.S. Pat. No. 4,013,287 and this is strictly limited for use on only one leg. In U.S. Pat. No. 3,337,237 a motorized waist band for weight reduction is adapted to be used in a motor vehicle. These devices are unsuitable for use as the exercise device according to the present invention. Furthermore, the wide variety of seat belts and shoulder harness securing apparatus, for example, U.S. Pat. No. 2,871,927 are also not adaptable for use in an automobile or other motor vehicle nor are they portable for use at home or work.

The present invention provides a more universal device that is portable and readily movable from one location to another due to the fact that the securing strap employed to attach the device to a seat is infinitely adjustable in length. The upright portion of chairs and seats come in all manner of shapes, sizes and thicknesses and any exercise device designed for use with any chair or, for that matter, a couch or bench, must be adaptable thereto.

SUMMARY OF THE INVENTION

In one aspect of the present invention there is provided sitting in a seat with a seat back extending upwardly, the device including an elongated seat-engaging strap having end portions, first adjustable releasable means for interconnecting the seat strap end portions to form a closed loop for placing the strap around a seat back; an elongated element having end portions, second adjustable means for securing the element end portions together for closely fitting the element in a loop around the chest of an exerciser; and a pair of tension members having ends, means for attaching one end of each member to the seat strap and another end to the element.

Further aspects are seen wherein first adjustable releasable means includes a buckle attached to one end portion of the seat strap, and the other end is placed through the buckle for engagement thereby. The second adjustable releasable means includes a pair of cooperative pressure-sensitive members, one member being affixed to one end portion of the chest element and the other member being affixed to the other end portion of the chest element. A pair of spaced shoulder straps is formed of elastic material each having end portions including means at the end portions thereof for attaching each shoulder strap to the chest element to inhibit downward movement of the chest element when an exerciser places tension on the pair of tension members. The means for releasably attaching each shoulder strap includes releasable fasteners to grasp the chest element to secure the shoulder strap thereto. Also, the means for attaching one end of each tension member includes a buckle. The buckle includes a U-shaped member having an inside surface and an outside surface with the chest element resting against the inside surface. The buckle includes a pivotal element mounted on the U-shaped member adjacent the inside surface for frictionally engaging the chest element to secure the tension member thereto. The means for attaching the other end of each tension member includes a ring slidably mounted on the chest element.

In other aspects of the present invention there is provided an exercise device adaptable for use by an exerciser sitting in a seat with a seat back extending upwardly therefrom which includes a harness adaptable to be worn by an exerciser; means for releasably securing the harness to a seat back which includes an adjustable length strap adapted to fit around a seat back and a spaced pair of tension members with fastener means for securing each tension member between the strap and the harness. The means further includes a buckle for securing the strap to a seat. The harness is formed of an adjustable length chest strap having end portions, second fastener means for closely fitting the strap around the chest of an exercise. The said second fastener means includes a pair of cooperative pressure-sensitive members affixed onto respective end portions of the chest strap. The tension members comprise extensible self-retracting elastic cords with fastener means, including snap hook fasteners, attached to each end of a tension member and the strap and harness include means adapted to be attached to the fasteners which includes a ring slidably movable on the harness. The harness includes an adjustable length chest strap and a pair of releasably attached elastic shoulder straps.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

DETAILED DESCRIPTION OF THE PREFERRED EMBODIMENT

Figure 1:
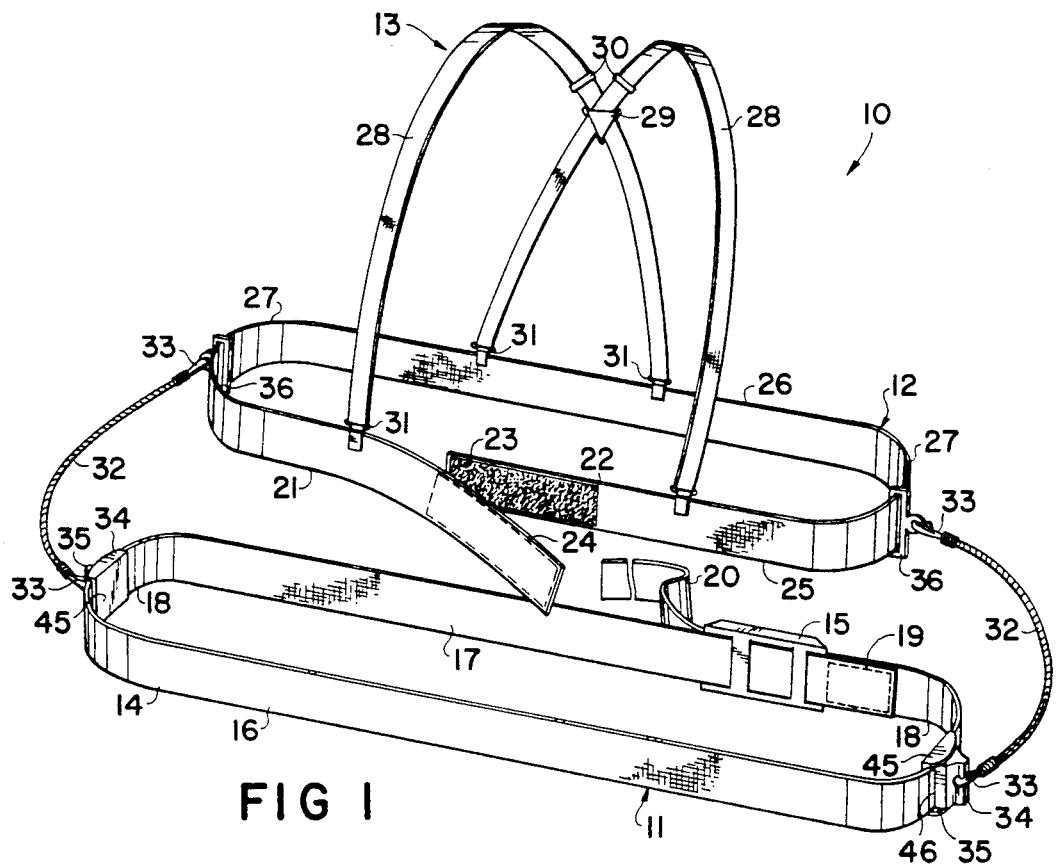
FIG. 1 is a perspective view of the seat exerciser device in accord with the present invention.

With reference now to FIG 1, the seat exercise device is illustrated in perspective and designated by numeral 10. The seat exerciser 10, in accord with the present invention includes a seat securing apparatus 11 and a harness means which may be formed by a body engaging apparatus 12 and a shoulder strap apparatus 13. The seat securing apparatus 11 is comprised of a long chair strap 14 which is a unitary inextensible strap having ends by which it can be secured into a loop via a conventional friction or multiple loop buckle 15, which may be the type shown in U.S. Pat. No. 4,118,833. The strap 14 has a front portion 16, a rear portion 17, side portions 18, one end 19 is formed into a loop and permanently sewn to engage around part of buckle 15 in a well known manner. The other end 20 of the strap 14 is looped through another part of the buckle 15 to secure the strap 14 into place as is understood in the art.

The body engaging apparatus 12 includes chest strap 21 having two ends onto which are sewn a cooperative pressure-sensitive fastener 22 which preferably is made of "Velcro" material having hook portion 23 and fluff or loop portion 24 as is well known. The substantially inextensible chest strap 21 is preferably a woven nylon member having a front portion 25; a rear portion 26; and two side portions 27. The shoulder strap apparatus 13 includes a pair of shoulder straps 28 secured rearwardly by an interconnection bracket 29 which is slidably adjustable and each strap 28 is adjustable in length by way of buckle fasteners 30, which may have material-engaging teeth, as are commonly found, for example, on suspenders. The shoulder straps 28 are elastic like conventional suspenders but are shortened due to the fact that they are not attachable adjacent the waist but only adjacent the chest and are connected to chest strap 21 via clamp fasteners 31, which also have material-grasping teeth.

Figure 2:
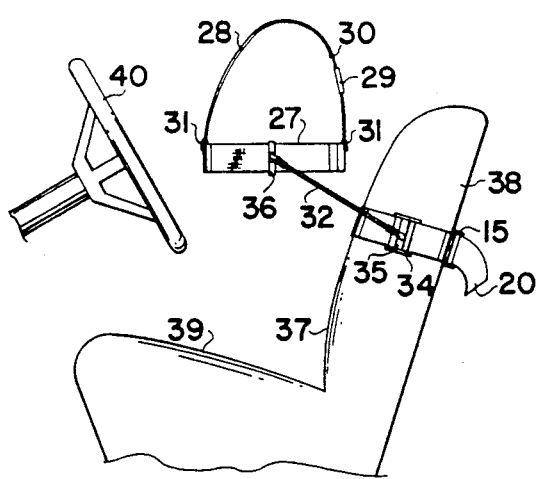
FIG. 2 is a side elevation of the seat exercise device of FIG. 1 attached to the seat of a motor vehicle.

Chest strap 21 is connected at its side portions 27 to seat strap 14 at its respective sides 18 by the fourth component of the seat exerciser 10, the pair of self-retracting tension members consisting of elastic bands or cords 32. Each cord 32 has opposite end portions onto which are attached conventional snap hook fasteners 33. Two snap fasteners 33 are attached to friction buckles 34. The buckles 34 utilize a U-shaped member 45 and a pivotal wedge member 35 mounted thereto, such member 35 being pivotal only in one direction when engaged with strap 14 because of the internal clearance between inside surfaces (not shown) of member 45 and the strap engaging surface 46 of wedge 35. Buckle 34 is well known in the art and is oriented to provide a greater force on wedge 35 to engage strap 14 when an associated elastic cord 32 is pulled forwardly, as shown in FIG. 2. The other ends of elastic bands 32 are attached to the chest strap 21 at its respective side portions 27 via a conventional slideably movable ring 36. In practice rings 36 may be located somewhat closer to seat back 38 than that depicted in FIG. 2.

Figure 3:
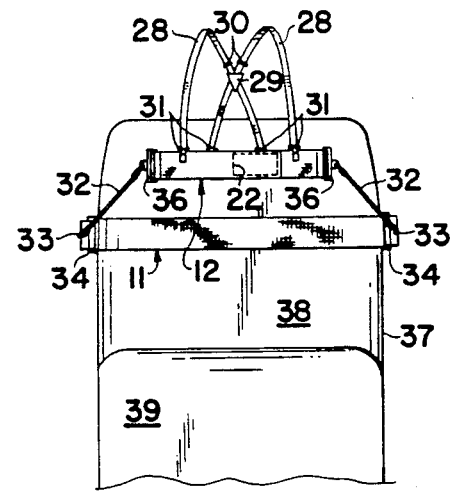
FIG. 3 is a front elevation of the exercise device in FIG. 2.

The seat exerciser 10 is illustrated in FIGS. 2 and 3 as it would be used in a motor vehicle having a seat 37 with upright back 38 and seat cushion 39 with the driver/exerciser (not shown) sitting in a forwardly facing position behind steering wheel 40. The body engaging and shoulder strap apparatus 12 and 13 respectively, are shown positioned forwardly of seat 37 as they would appear during a forward exercise motion by the driver. The elastic cords 32 are stretched under tension during a forward and/or side motion and this provides the exerciser with resistance against the body, notably the abdominal and associated midsection muscles.

Figure 4:
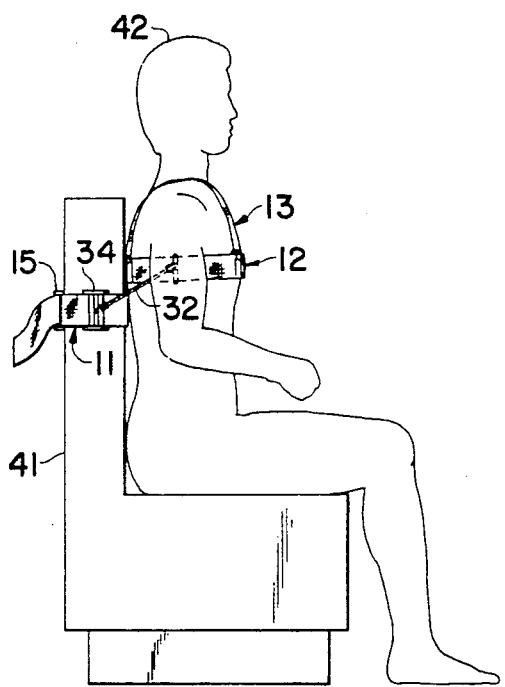
FIG. 4 is a side elevational view of the seat exercise device in FIG. 1 being used with an ordinary chair.
Figure 5:
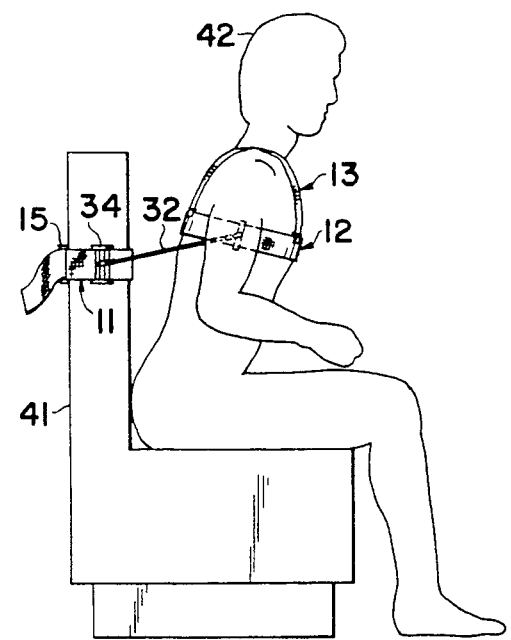
FIG. 5 is a side elevational view of the seat exercise device of FIG. 4 under tension.

Chair strap 14 is of sufficient length to be used with a wide variety of seats 37 including chairs 41 and/or a sofa used in the home. As illustrated in FIGS. 4 and 5, the seat exerciser is used just as it would be if mounted in a motor vehicle. The seat engaging apparatus 11 is adjusted in length and secured into position around chair 41 via buckle 15. Buckles 34 are then fixed into position on seat strap 14. The body engaging apparatus 12 is secured around the chest and kept in place via shoulder strap apparatus 13 as the exerciser 42 moves forward and/or sideways.

The elastic cords 32 fit onto chest strap 21 via the rings 36. The rings 36 are free to move along the strap 21 and thus cooperate with the fixed buckles 34 to provide adequate exercise resistance regardless of the width of a seat 37 or chair 41. Limited rotational movements, as well as, side-to-side movements may also be performed by the exerciser if desired.

The seat exerciser 10 in accord with the present invention is illustrated as comprising different components that are attached via releasable fasteners. For example, shoulder straps 28 are used to inhibit downward movement of chest strap 21, but they are not an essential part of the seat exerciser 10.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. An exercise device adaptable for use by an exerciser sitting in a seat with a seat back extending upwardly therefrom comprising:
   an elongated seat-engaging strap having end portions, first adjustable releasable means for interconnecting said seat strap end portions to form a closed loop for placing said strap around a seat back;
   an elongated element having end portions, second adjustable means for securing said element end portions together for closely fitting said element in a loop around the chest of an exerciser; and
   a pair of self-retracting tension members having ends, means for attaching one said end of each said tension member to said seat strap and the other said end of each said tension member to said element, each said tension member being elongatable by a force exerted between said element and said strap by an exerciser with said element around the chest of an exerciser, said means for attaching said other end of each said tension member including a ring slidably mounted on said elongated element.

2. The exercise device as defined in claim 1 wherein said first adjustable releasable means for interconnecting said end portions of said seat strap includes a buckle, said buckle being attached to one said end portion of said seat strap, the other end being placed through said buckle for engagement thereby.

3. The exercise device as defined in claim 1 wherein said second adjustable releasable means includes a pair of cooperative pressure-sensitive members, one said member being affixed to one said end portion of said chest element, another said member being affixed to said other said end portion of said chest element.

4. The exercise device as defined in claim 1 further including a pair of spaced shoulder straps each having end portions, each said shoulder strap including means at said end portions thereof for attaching each said shoulder strap to said chest element to inhibit downward movement of said chest element when an exerciser places tension on said pair of tension members.

5. The exercise device as in claim 4 wherein said means for releasably attaching each said shoulder strap includes releasable fasteners to grasp said chest element to secure said shoulder strap thereto.

6. The exercise device as defined in claim 4 wherein said shoulder straps are formed of elastic material.

7. The exercise device as in claim 1 wherein said means for attaching said one said end of each said tension member includes a buckle.

8. The exercise device as in claim 7 wherein said buckle includes a U-shaped member having an inside surface and an outside surface, said seat element resting against said inside surface, said buckle including a pivotal element mounted on said U-shaped member adjacent said inside surface for frictionally engaging said seat element to secure said tension member thereto.

9. The exercise device as defined in claim 1 wherein said tension members are formed of elastic material.

10. An exercise device adaptable for use by an exerciser sitting in a seat with a seat back extending upwardly therefrom comprising:
a harness including an elongated element adaptable to be worn by an exerciser, first means for selectively adjusting the length of said element to accommodate various sizes of exercisers; second means for releasably securing said harness to a seat back; said second means for releasably securing including an adjustable length strap adapted to fit around a seat back, said second means further including a spaced pair of tension members, fastener means for securing each said tension member between said strap and said element, each said tension member being elongatable by a force exerted between said element and said strap, said fastener means including snap hook fasteners, each end of said tension member having a said snap hook fastener attached thereto, said strap and said harness including means adapted to be attached to said fasteners, said means on said harness adapted to be attached to said fastener including a ring, said ring being slidably movable on said harness.

11. The exercise device as defined in claim 10, wherein said means for releasably securing further includes a buckle for securing said strap to a seat.

12. The exercise device as defined in claim 10 wherein said harness includes an adjustable length chest strap having end portions, second fastener means for closely fitting said strap around the chest of an exerciser, said second fastener means including a pair of cooperative pressure-sensitive members affixed onto respective end portions of said chest strap.

13. The exercise device as defined in claim 10 wherein said tension members comprise extensible self-retracting elastic cords.

14. The exercise device as defined in claim 10 wherein said fastener means includes snap hook fasteners, each end of said tension member having a said snap hook fastener attached thereto, said strap and said harness including means adapted to be attached to said fasteners.

15. The exercise device as defined in claim 10 wherein said harness includes a chest strap and a pair of elastic shoulder straps.

16. The exercise device as defined in claim 15 wherein said shoulder straps are releasably attached to said chest strap.

17. The exercise device as defined in claim 15 wherein said chest strap is of adjustable length.

18. An exercise device adaptable for use by an exerciser sitting in a seat with a seat back extending upwardly therefrom comprising:
a seat engaging strap having a front portion, a rear portion, two side portions, and end portions, said strap being adaptable to be secured in a loop around a seat back;
first adjustable releasable means secured to one said end portion of said strap for interconnecting said strap in a closed loop, said other end portion of said strap releasably secured by said first means when said strap is secured to a seat;
a chest strap having a front portion, a rear portion, two side portions, and end portions, said chest strap being adaptable to be secured in a loop around the chest of an exerciser;
second adjustable releasable means secured to said end portions of said chest strap for securing said chest strap in a closed loop around the chest of an exerciser;
a pair of elastic self-retracting tension members each having opposite ends;
releasable tension member fastener means for attaching one said end of each said member to one said side portion of said seat strap and the other said end of each said member to one said side portion of said chest strap, each said tension member being elongatable by a force exerted between said chest strap and said seat strap by an exerciser with said chest strap around the chest of an exerciser; and
a pair of shoulder straps having ends, releasable shoulder strap fastener means for attaching one said end of each said shoulder strap to said rear portion of said chest strap and attaching the other said end of said shoulder strap to said front portion of said chest strap said releasable tension member fastener means including a ring attached to the other said end of each said member and slidably movable on said chest strap.

* * * * *